Figure 1:
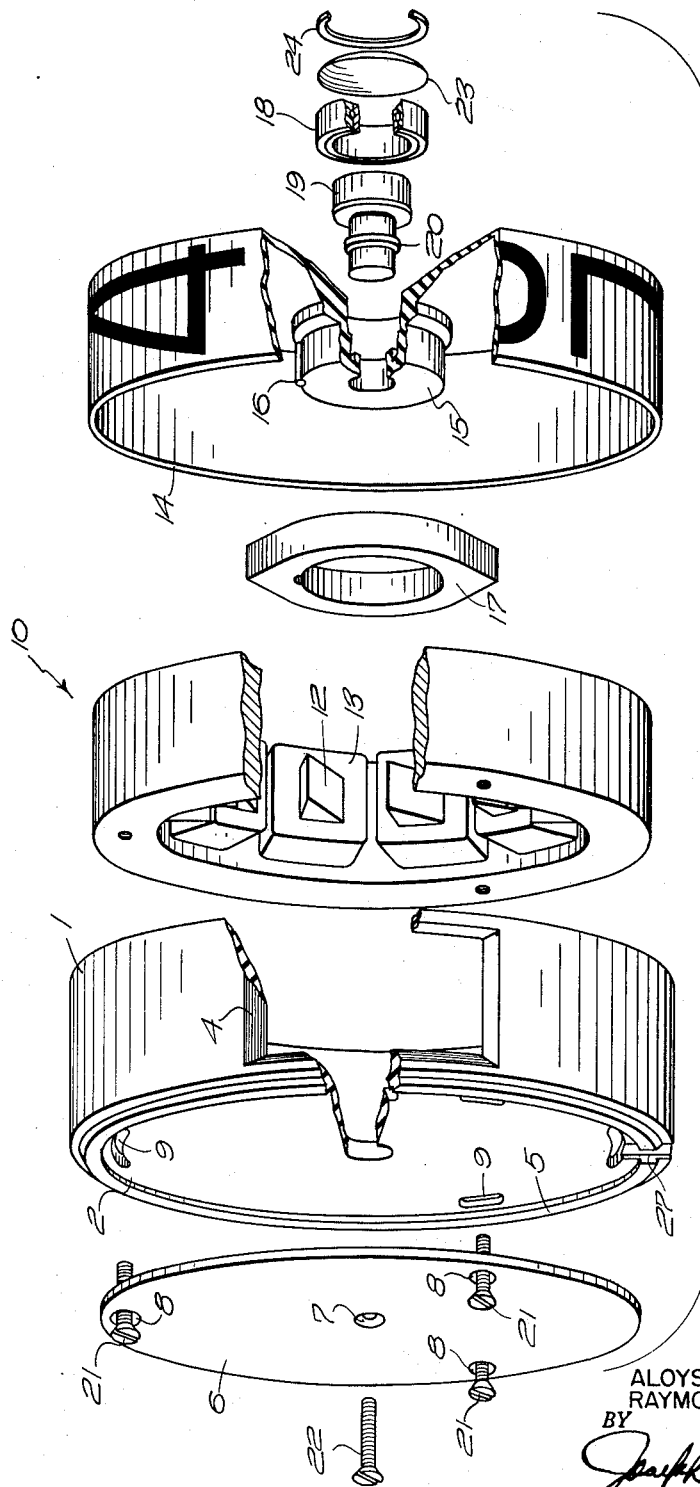

Jan. 14, 1964   R. J. MILAS ETAL   3,118,138
ELECTROMAGNETIC INDICATOR

Filed Jan. 8, 1960   3 Sheets-Sheet 1

INVENTORS
ALOYSIUS E. KNOTOWICZ
RAYMOND J. MILAS
BY
Joseph Weingarten
ATTORNEY

Jan. 14, 1964 R. J. MILAS ETAL 3,118,138
ELECTROMAGNETIC INDICATOR
Filed Jan. 8, 1960 3 Sheets-Sheet 2

INVENTORS
ALOYSIUS E. KNOTOWICZ
RAYMOND J. MILAS
BY
Joseph Weingarten
ATTORNEY

INVENTORS
ALOYSIUS E. KNOTOWICZ
RAYMOND J. MILAS
BY Joseph Weingarten
ATTORNEY

United States Patent Office 3,118,138
Patented Jan. 14, 1964

3,118,138
ELECTROMAGNETIC INDICATOR
Raymond J. Milas, Meriden, and Aloysius E. Knotowicz, Torrington, Conn., assignors to The Patent Button Company, Waterbury, Conn., a corporation of Connecticut
Filed Jan. 8, 1960, Ser. No. 1,294
6 Claims. (Cl. 340—378)

This invention relates in general to a device for displaying a character selected by means of an electrical signal and more particularly, the invention pertains to an arrangement which causes the selected character to remain in view after the original electrical signal has been terminated and to be displaced only by the occurrence of a different electrical signal.

The present invention is directed to a numeric display device responsive to an electric signal for visually displaying a numeral selected by applying an electrical signal in an appropriate manner. In particular the present invention constitutes an improvement over the invention covered by U.S. Patent No. 2,943,313. In one embodiment of the invention, a character bearing wheel is secured to a magnet having salient poles, the magnet and wheel forming a rotor which is mounted in a manner permitting it to rotate freely, and a stationary electromagnetic structure (i.e. a stator) having a pole for each character on the wheel surrounds the magnet. Each pole is provided with its own winding so that when a current is caused to flow in the winding, the pole becomes magnetized in one polarity and all the other poles are magnetized in the opposite polarity thereby establishing a magnetic field. The salient pole magnet is caused to rotate by the magnetic field until the magnet is aligned with the pole having the energized winding and in doing so the magnet causes the attached character bearing wheel to also assume a fixed position. A viewing window is provided in a structure housing the rotor and stator, the window permitting one of the characters inscribed on the wheel to be displayed. The ends of the magnet poles are shaped and the poles are arranged so that when a winding is energized, the vector representing the magnetic field is directed along the longitudinal axis of the pole having the energized winding. The magnet aligns itself with the magnetic field vector. Characters are located on the wheel in such a manner that for each vector aligned position of the permanent magnet with the stator, a corresponding character is presented in the window but the character is not centered in the window. After the winding is de-energized and the magnetic field has collapsed, the salient pole magnet causes magnetism to be induced in the adjacent poles of the stator so that the magnet tends to be held in its vector aligned position. However, the stator poles are shaped so that the flux path offering the least reluctance is an "indexed" position offset from the vector aligned position, consequently, the magnet moves to the indexed position and remains there until the stator is again energized by an electrical signal. When the magnet moves to the indexed position, the character visible in the window becomes centered in that aperture.

The invention has particular merit in that it permits ten positions of the magnet to be achieved without requiring a reversal in the polarity of the electrical signals and because indexing of a selected character in the window is inherent in its construction.

The principal object of this invention is to provide an electromagnetic indicator for displaying a character selected by means of an electrical signal, in which the selected character is automatically brought to an indexed position upon termination of the selecting signal.

A further object of the invention is to provide an electromagnetic indicator for displaying a character selected by applying an electrical signal which is always of the same polarity to one winding of a stator in said indicator.

It is another object of the invention to provide an electromagnetic indicator of the type having a rotor automatically secured in an indexed position upon termination of a selection signal, which is simpler in construction than comparable prior devices.

Figure 6:
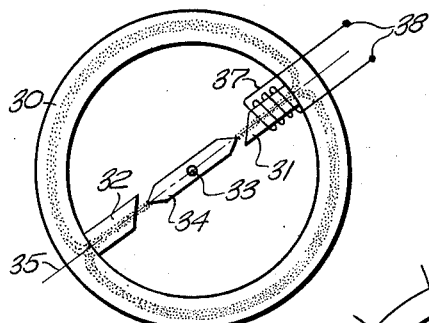
Figure 4:
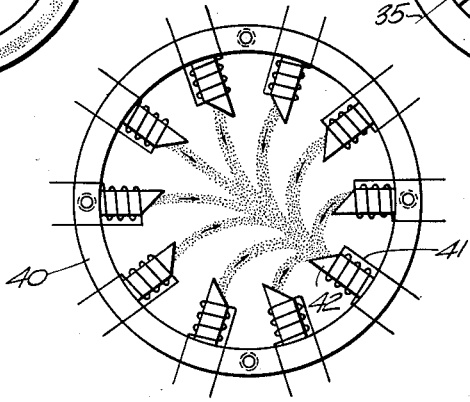
Figure 5:
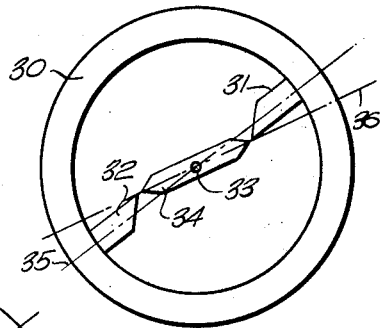
Figure 2:
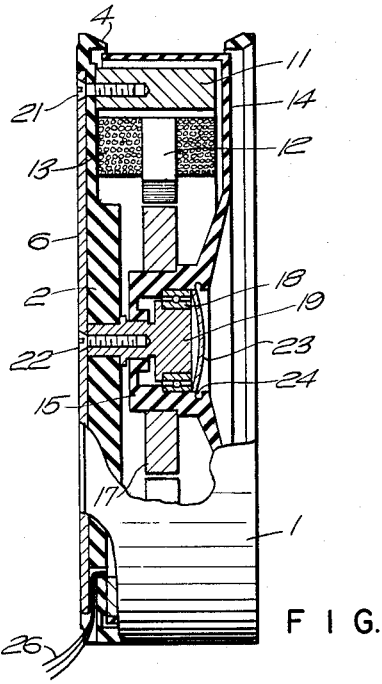
Figure 3:
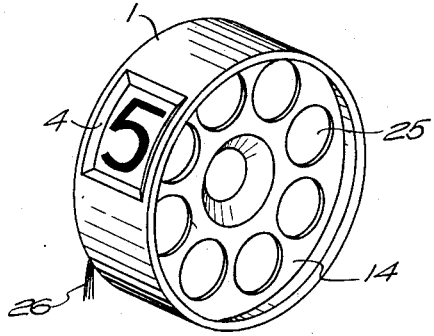
Figure 7A:
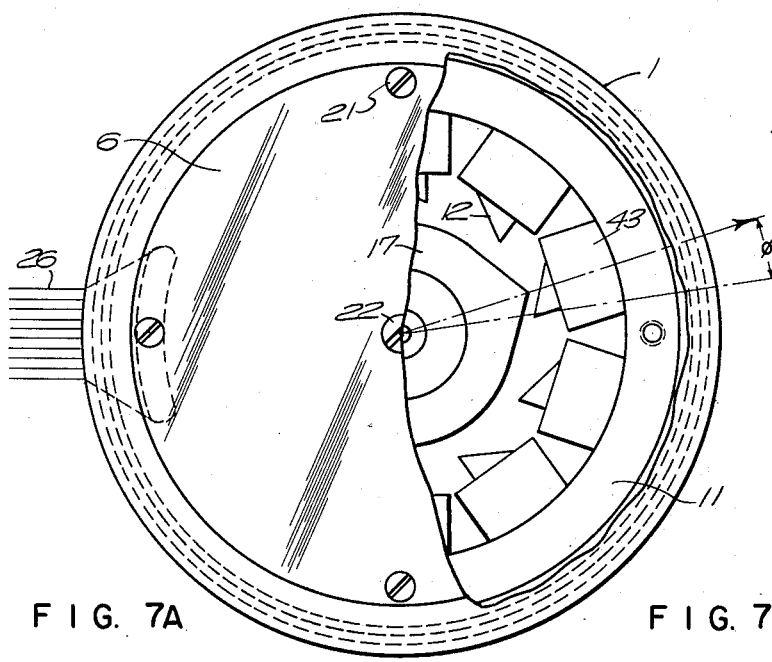
Figure 7B:
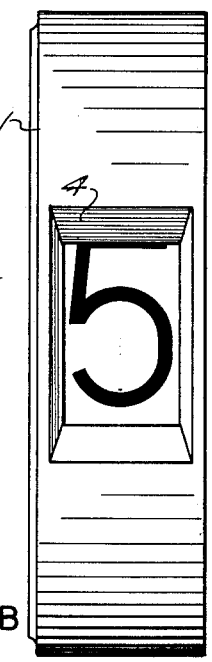
Figure 8A:
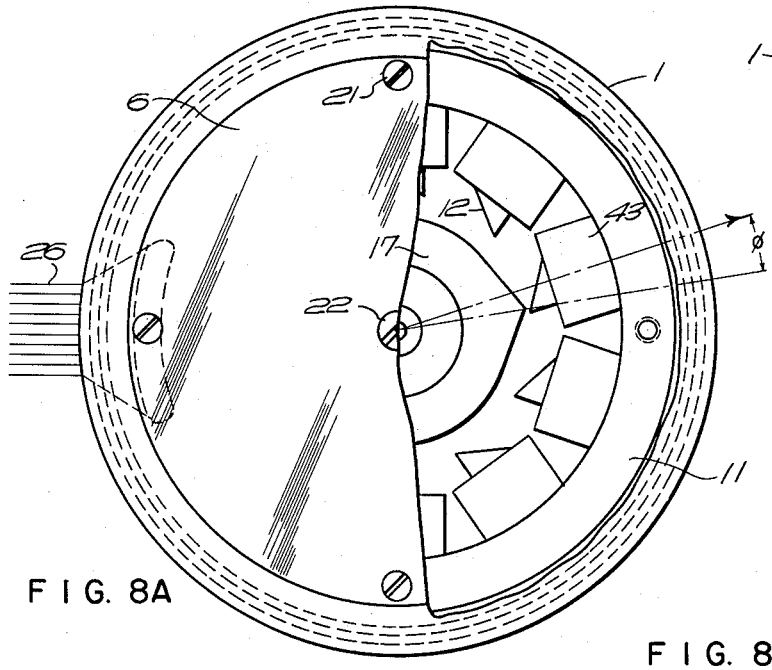
Figure 8B:
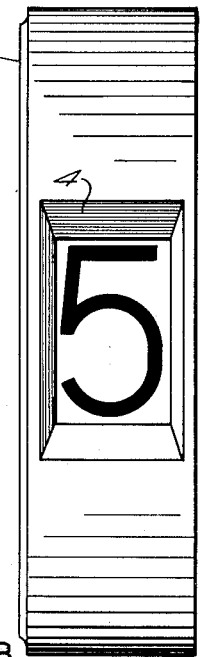

The principle of operation of the invention and the mode of construction of a preferred embodiment can be better understood by a perusal of the following exposition when considered in conjunction with the appended drawings in which:

FIG. 1 is an exploded view depicting the various components employed in a practical embodiment of the invention, FIG. 2 is a view of the assembled apparatus with parts broken away to expose the interior, FIG. 3 is a perspective view of the assembled device, FIG. 4 depicts in schematic form a type of stator employed in the invention, FIGS. 5 and 6 are illustrated to explain the inventions principle of operation, FIGS. 7A and 7B show the position of a numeral in the window when the magnet is vector aligned with an energized stator pole, FIGS. 8A and 8B show the position of the same numeral in the window when the magnet is in the "indexed" position.

The construction of a practical embodiment of the invention is depicted in FIG. 1 which shows a housing 1 constituted by a hollow cylinder closed at one end by a wall 2 provided with a central circular aperture 3. A window 4 is formed in the periphery of the cylinder, the edges of the window being beveled to accentuate its outline and provide a pleasing appearance. An annular bead 5 is situated on the end wall 2, the recess formed by the bead receiving a soft iron disc 6 having a central perforation 7 and three other holes 8 spaced about the disc's edge. The end wall 2 of the housing has three arcuate slots 9 in it which can be aligned with the holes 8 in the disc. A stator 10 is depicted in which a portion of the core 11 has been broken away to show a representative-shaped pole 12 and its winding 13. The character bearing wheel 14 is formed with a hub 15 on which is provided a key or spline 16. A permanent magnet 17 having a central aperture in which a keyway is provided, fits over the hub and is keyed thereto by the spline. The magnet and wheel constitute a subassembly termed a "rotor." The rotor is mounted on a ball bearing 18 which fits upon a shaft 19 having a collar 20. As shown in FIG. 2, the stator 10 is secured within the housing 1 by screws 21 which protrude through disc 6, the arcuate slots 9 in end wall 2, and engage threaded holes in the stator. The shaft 19 projects into the central aperture in the end wall and the collar 20 is caused to seat firmly against the wall by a screw 22 which extends through disc 6 and engages threads in the shaft. A saucer-shaped cover 23, secured in place by a snap ring 24, prevents dust and dirt from entering the ball bearing. From the view of the assembled device in FIG. 2 it is evident that the wheel 14 is shaped to fit over the stator 9. A portion of the wide rim of the wheel is visible in the window as indicated in FIG. 3 and as the wheel rotates, the characters graven thereon are successively displayed. The side wall of wheel 14 visible in the figure is perforated by circular holes 25 to lessen the mass of the wheel so as to make the wheel easier to rotate by reducing its inertia. The wheel is recessed within the housing so that the device of FIG. 3 can be arranged side by side with other like devices to form a higher order counter. The bead 5 (FIG. 1) of one device is proportioned to fit snugly within the rim of the housing of the adjacent device. The disc 6, being fabricated of soft iron, acts as a magnetic shield to prevent one device from affecting the adjacent lateral device. In FIG. 2, leads 26 are shown extending from the housing. Those leads are connected to the windings 13 of the stator (FIG. 1) and the housing is provided with a channel 27 allowing the leads to be brought out.

The principle of operation of the invention may be apprehended by considering the ferromagnetic annulus 30 of FIG. 5 having two inwardly extending diametrically opposed soft iron poles 31 and 32. At the geometrical center 33 of the annulus a permanent magnet 34 is pivotally mounted permitting it to rotate freely. The tips of the magnet are shaped to provide salient poles and the ends of poles 31 and 32 are angular. Assuming the magnet 34 initially is rotating, as the tips of the magnet approach poles 31 and 32, the magnet 34, by induction, causes poles 31 and 32 to be magnetized oppositely to the polarity of the adjacent tips of magnet 34 and the force of attraction causes the magnet to be brought to a stop. The magnet then assumes the position shown in FIG. 5 because in that position the air gaps between the salient ends of the magnet and the poles 31 and 32 are a minimum and the reluctance to the magnetic flux is also a minimum. If the magnet is moved to another position, it will ultimately return to the position in which the magnetic flux follows the path of least reluctance. For example, where the magnet is moved so that it is aligned with the line 35 through the longitudinal axis of poles 31 and 32, the magnet will, if free to rotate, move until it is again aligned with the line 36.

Consider now the same ferromagnetic annulus 30 and the poles 31 and 32 in FIG. 6. A winding 37 is now positioned on the pole 31, the ends of the winding being brought out to a pair of terminals 38. By applying an electric potential at those terminals, a current is caused to flow in winding 37 which establishes a polarizing magnetic field. The direction of current flow determines whether the pole 31 becomes a south or north pole. Assuming the magnitude of the current is sufficient to cause magnetic flux saturation of core 30 and the current flow is such as to make pole 31 a north pole, the pole 32 then becomes a south pole. The end of pole 31 is slanted at an angle of about 45° and is parallel to the similarly slanted end of pole 32. The magnetic flux in the gap between the two poles is directed along the longitudinal axis of the poles as indicated in FIG. 6. If the bar magnet 34 were pivotally suspended in the center of the stator in FIG. 6, the magnet would turn until it was aligned with the line 35 and would remain in that position as long as the magnetic field established by the current in winding 37 existed. Upon collapse of the magnetic field, the magnet 34 would move to the "indexed" position depicted in FIG. 5.

FIG. 4 illustrates schematically the type of stator employed in the invention. The stator has an annular core 40 made of a ferromagnetic substance. Ten poles are regularly spaced at 36° intervals about the inside circumference of the core, each of the poles having a surrounding winding. The inward face of each pole is beveled to provide a slanted surface and the beveled surfaces of diametrically opposed poles are parallel. Assuming, by way of example, that winding 41 is energized with a current causing pole 42 to be magnetized as a north pole and causing flux saturation in the core, the other poles become magnetized south poles thereby establishing a magnetic field in the nature of the field indicated by the shaded areas in FIG. 4. The magnetic field can be represented by a vector directed along the longitudinal axis of pole 42. A bar magnet pivoted in the center of the stator would rotate until it was aligned with the magnetic field vector. Energizing any other of the windings would cause a comparable result. Thus, the bar magnet could be vector aligned in any one of ten positions by energizing a selected one of the ten windings.

Reverting now to FIG. 1, it may be recalled that magnet 17 is keyed to the hub 15 of wheel 14 so that the wheel turns with the magnet and, hence, can be made to assume any one of ten aligned positions. Numerals are arranged on the surface of the wheel and each numeral has a location corresponding to one of the ten vector aligned positions of the magnet such that the numeral appears in the window 4 when the magnet is thus aligned. FIG. 7A depicts the salient pole magnet 17 in a vector aligned position and it is apparent from FIG. 7B that the numeral is not centered in the window. After the current in winding 43 has ceased to flow, causing collapse of its magnetic field, the magnet 17 rotates through the angle $\phi$ to the "indexed" position depicted in FIG. 8A, thereby causing the numeral "5" to be centered in the window. The numeral "5" will remain displayed in the window until one of the windings of the stator is again energized.

It is assumed that the windings of the stator are energized in a consistent manner, viz., so that the energized pole always is of the same magnetic polarity. The actual magnetic polarity of the energized pole is, practically, not of critical importance. That is, the direction of the current flowing in an energized winding may be such as to cause its pole to become a north pole, provided that every other energized winding causes its pole to be a north pole. As a corollary, if the direction of the current flowing in an energized winding is such as to cause its pole to become a south pole, every one of the other nine windings must, if energized, cause its pole to become a south pole.

The construction illustrated in FIG. 1 can be modified by employing a stator of the FIG. 4 type in which every alternate pole has been eliminated so that the stator has five poles spaced at 72° intervals about a circle. Ten discrete vector aligned positions of the magnet 17 can still be obtained with the five pole stator, but it is then necessary to reverse the polarity of the input signals to attain five of those positions. Each of the five poles affords two magnetic field vectors whose directions differ by 180°. The vector which is established by the pole depends upon the direction of current flow in the pole's winding and the direction of current flow is determined by the polarity of the applied electrical signal. Hence, the magnet 17 can be compelled to asume either of two positions by each pole on the stator simply by controlling the polarity of the energizing electrical signal impressed on the pole's winding. Because the five poles retain their slanted faces, indexing occurs after the electrical signal is terminated. In the five pole stator, one pole of the salient pole magnet 17 will always be adjacent the slanted face of a stator pole when the magnet is vector aligned.

The angle at which the faces of the poles are slanted is not critical and the optimum angle can readily be determined empirically. An angle of 45° was employed in a prototype of the invention with satisfactory results. Other acute angles, varying within the range of 30° to 60° have been tried and have caused indexing of the magnet in an adequate manner.

In view of the multitude of ways in which the invention can be embodied, it is not intended that the scope of the invention be restricted to the precise structures illustrated in the drawings or described in the specification. Rather it is intended that the scope of the invention be delimited by the claims appended hereto and to include such structures as do not in essence fairly depart from the invention there defined.

What is claimed is:

1. An electromagnetic display device comprising a housing having a window therein, a stator secured in said housing, said stator having an annular core carrying a plurality of inwardly-projecting radially-extending poles, each of said poles having an end face disposed at an oblique angle to its longitudinal axis, a winding disposed about each of said poles, and a rotor pivotally mounted in said housing, said rotor including a salient pole magnet surrounded by said core and a character bearing wheel, the characters on said wheel being positioned to appear in said window when said wheel is rotated.

2. An electromagnetic display device comprising, a stator having a plurality of magnetizable radially-extending poles arranged upon a ferromagnetic core, each of said poles having a winding thereon, the energization of any one of said windings establishing a magnetic field whose vector is directed along the axis of the pole carrying the energized winding, each of said poles having an end face which is slanted relative to the pole axis, a rotor having a magnet affixed to a character bearing member, means mounting said rotor in a manner permitting said rotor to turn freely, said magnet being encircled by said annular core, said magnet having salient poles, at least one of said salient poles being positioned proximate to the slanted face of a stator pole when said magnet is aligned with the vector of a magnetic field established by an energized winding, and said magnet being caused to swing to an indexed position by the proximate slanted face upon collapse of the magnetic field.

3. A display device comprising, a cylindrical housing, a stator disposed in said housing and secured thereto, said stator having a ferromagnetic core upon which a spaced array of radially-extending electromagnets are fixed, each of said electromagnets being comprised by a pole and an encircling winding, each of said poles having an end face slanted relative to the pole axis, a rotor, an axle secured to said housing and mounting said rotor, said rotor including a salient pole magnet disposed within said array of electromagnets and a wheel having characters thereon, a window in said housing for viewing a portion of said character bearing wheel.

4. An electromagnetic display device comprising, a cylindrical housing, a stator disposed in and secured to said housing, said stator having a ferromagnetic annular core, a circular array of electromagnets periodically spaced about said core, each of the electromagnets in said array having a pole protruding inwardly from said core and a winding for magnetizing the pole, a shaft disposed in the center of said circular array, a rotor mounted on said shaft, said rotor having a character bearing surface, said housing having a window for viewing the characters on said surface, said rotor including a magnet having salient poles, said magnet being disposed to permit its salient poles to be brought into close proximity with the inward ends of the poles of said electromagnets, and the inward end of the pole of each electromagnet being slanted to the pole axis to cause said magnet to be attracted to an indexed position in the absence of a magnetic field due to an energized electromagnet.

5. An electromagnetic decimal display device comprising, a hollow cylindrical housing having a closure at one end, said housing having a window in its periphery, a stator disposed in and secured to said housing, said stator having a ferromagnetic annular core, a circular array of ten stator poles protruding inwardly from said core, each of said stator poles having its inward end terminated in a surface slanted relative to the pole axis, a plurality of windings, each of said windings being wound around a different one of said stator poles, a shaft disposed in the center of said array and secured to said housing closure, a rotor having a hub mounted on said shaft, a character bearing wheel secured to said hub, the characters on said wheel being positioned to be displayed in the window of said housing, a magnet affixed to said hub, said magnet having salient poles which are brought into close proximity with the inward ends of said stator poles when said rotor turns in response to the magnetic field established by energization of one of said windings, and the slanted surfaces of said stator poles being arranged to cause said magnet to be attracted to an indexed position upon collapse of said magnetic field.

6. An electromagnetic decimal display device comprising a housing having a window, a stator disposed within said housing, said stator having a ferromagnetic annular core with a circular array of stator poles, a winding on each of said poles, the energization of any one of said windings establishing a magnetic field whose vector is directed along the pole carrying the energized winding, a rotor within said housing, said rotor comprising a salient pole magnet and a character-bearing member connected to rotate as a unit, means rotatably mounting said rotor whereby when any one of said windings is energized said magnet will swing to a selected position in alignment with the vector of the magnet field established by said energized winding, said character-bearing member having characters spaced in accordance with the angular displacement of the vectors of the magnetic fields established by energizing said windings one by one, said characters disposed so that at each of said selected positions of said magnet a different selected character will be displayed off-center in said window, each pole having its inward end terminating in an end face slanted relative to its pole axis so that the air gap between said magnet and said slanted end face of each pole is minimum at an index magnet position displaced angularly from the selected magnet position established by energizing the winding of said each pole, whereby when an energized winding is suddenly deenergized and no other winding is energized the magnet will shift from a selected position to a predetermined index position, said index magnet positions being displaced from said selected magnet positions by amounts sufficient for said selected characters to be centered in said window when said magnet shifts from said selected magnet positions to said index magnet positions.

References Cited in the file of this patent

UNITED STATES PATENTS

| | | |
|---|---|---|
| 2,250,969 | Seefeld | July 29, 1941 |
| 2,499,316 | Johnson | Feb. 28, 1950 |
| 2,908,900 | Gordon et al. | Oct. 13, 1959 |

FOREIGN PATENTS

| | | |
|---|---|---|
| 327,240 | France | Mar. 20, 1903 |